(12) United States Patent
Borruso

(10) Patent No.: US 8,830,119 B2
(45) Date of Patent: Sep. 9, 2014

(54) RADAR SENSOR ALIGNMENT

(75) Inventor: Robert Borruso, Davisburg, MI (US)

(73) Assignee: Robert Bosch GmbH, Stuttgart (DE)

( * ) Notice: Subject to any disclaimer, the term of this patent is extended or adjusted under 35 U.S.C. 154(b) by 274 days.

(21) Appl. No.: 13/550,736

(22) Filed: Jul. 17, 2012

(65) Prior Publication Data

US 2014/0022115 A1    Jan. 23, 2014

(51) Int. Cl.
*G01S 7/40* (2006.01)
*G01S 7/497* (2006.01)

(52) U.S. Cl.
CPC ............. *G01S 7/4026* (2013.01); *G01S 7/4972* (2013.01)
USPC ................................ 342/167; 342/70; 33/288

(58) Field of Classification Search
USPC .......................................................... 342/167
See application file for complete search history.

(56) References Cited

U.S. PATENT DOCUMENTS

| | | | |
|---|---|---|---|
| 4,615,618 A * | 10/1986 | Bailey et al. ............. | 356/139.09 |
| 5,781,286 A * | 7/1998 | Knestel ..................... | 356/139.09 |
| 6,087,995 A * | 7/2000 | Grace et al. ................... | 343/703 |
| 6,329,952 B1 * | 12/2001 | Grace ........................... | 343/703 |
| 6,335,705 B1 * | 1/2002 | Grace et al. .................... | 343/703 |
| 6,363,619 B1 | 4/2002 | Schirmer et al. | |
| 6,437,731 B1 | 8/2002 | Henrio et al. | |
| 6,714,156 B1 | 3/2004 | Ibrahim et al. | |
| 6,809,806 B1 * | 10/2004 | Carnevale et al. ......... | 356/141.2 |
| 6,823,601 B2 | 11/2004 | Murray | |
| 6,842,238 B2 * | 1/2005 | Corghi ..................... | 356/139.09 |
| 7,121,011 B2 | 10/2006 | Murray et al. | |
| 7,853,374 B2 * | 12/2010 | Ko ................................. | 701/408 |
| 2006/0185180 A1 * | 8/2006 | MacKelvie ................ | 33/203.18 |
| 2010/0177304 A1 * | 7/2010 | Rogers ..................... | 356/139.09 |
| 2011/0279814 A1 * | 11/2011 | Grogan ..................... | 356/139.09 |

FOREIGN PATENT DOCUMENTS

| | | |
|---|---|---|
| DE | 19857871 | 10/2000 |
| DE | 10114799 | 10/2002 |
| EP | 0905526 | 3/1999 |
| EP | 2113787 | 11/2009 |
| WO | 2008058785 | 5/2008 |

OTHER PUBLICATIONS

PCT/US2013/050725 International Search Report and Written Opinion dated Oct. 25, 2013 (12 pages).
Bendix, "Instructions for the Vertical and Lateral Alignment of Bendix Radar Sensors," Bendix Commercial Vehicle Systems LLC, (2011), 6 pages.

* cited by examiner

*Primary Examiner* — Matthew M Barker
(74) *Attorney, Agent, or Firm* — Michael Best & Friedrich LLP

(57) ABSTRACT

Systems, apparatuses, and methods for aligning a radar sensor included in a vehicle. One method includes generating a laser cross-beam in front of the radar sensor that is approximately perpendicular to a thrust line of the vehicle and mounting a sensor alignment apparatus on the radar sensor. The sensor alignment apparatus includes a mounting arm and a receiver flag. The mounting arm supports the receiver flag, and the receiver flag includes a first surface that intersects the cross-beam at a first point and a second surface opposite the first surface that intersects the cross-beam at a second point. The method further includes determining a position of the first point, determining a position of the second point, determining a difference between the position of the first point and the position of the second point, and determining an adjustment for the radar sensor based on the difference.

18 Claims, 6 Drawing Sheets

RADAR SENSOR ALIGNMENT

BACKGROUND

This invention relates to methods and systems for aligning a radar sensor included in a vehicle.

SUMMARY

Many vehicles are equipped with a forward-facing radar sensor. The radar sensor can be part of an adaptive cruise control ("ACC") system. The ACC system allows a vehicle operator to set a desired cruise speed and the ACC system maintains the vehicle at the set speed without requiring operator input. However, if the radar sensor detects another vehicle or object (i.e., a "target object") located in front of the vehicle that is traveling slower than the vehicle, the ACC adjusts the speed of the vehicle to prevent the vehicle from impacting the target object. After the radar sensor no longer detects the target object, the ACC system increases the speed of the vehicle to the desired cruise speed previously set by the vehicle operator.

To ensure that the ACC system operates correctly, it is important that the radar sensor works properly. In most cases, to provide accurate information to the ACC system, the radar sensor should be aligned with the thrust line of the vehicle. The thrust line of the vehicle refers to the direction in which the rear wheels are pointing. A thrust angle refers an angle between the thrust line and a centerline that runs down the center of the vehicle between the wheels.

Overtime, however, the radar sensor may become misaligned with the thrust line. Currently, to realign the radar sensor to the thrust line, driving feedback loops are used. In particular, an adjustment is made to the radar sensor and then the vehicle is driven to test the adjustment. The process is repeated until a proper alignment is identified. Given the repetitive nature of this process, alignment of the sensor can be time-consuming and identifying an optimal alignment of the radar sensor is difficult and imprecise.

Therefore, embodiments of the present invention provide a system for aligning a sensor. The system includes wheel alignment equipment and a sensor alignment apparatus. The wheel alignment equipment includes a first arm and a second arm. The first arm connects to a first wheel of a vehicle and includes a first laser for generating a first visible laser beam approximately perpendicular to a thrust line of the vehicle. The second arm connects to a second wheel of the vehicle and includes a second laser for generating a second visible laser beam approximately perpendicular to the thrust line of the vehicle. The sensor alignment apparatus includes a mounting arm configured to be mounted on a radar sensor included in the vehicle and a receiver flag supported by the mounting arm and positioned in front of the radar sensor. The receiver flag includes a first surface for receiving the first laser beam at a first point and a second surface opposite the first surface for receiving the second laser beam at a second point. A difference between a position of the first point and a position of the second point indicates an adjustment for the radar sensor to align the radar sensor with the thrust line.

Embodiments of the present invention also provide a sensor alignment apparatus. The apparatus includes a mounting arm configured to be mounted on a radar sensor included in a vehicle and a receiver flag supported by the mounting arm and positioned in front of the radar sensor. The receiver flag includes a first surface for receiving a first laser beam at a first point and a second surface opposite the first surface for receiving a second laser beam at a second point. The first laser beam and the second laser beam are approximately perpendicular to a thrust line of the vehicle and a difference between a position of the first point and a position of the second point indicates an adjustment for the radar sensor to align the radar sensor with the thrust line.

Further embodiments of the invention also provide a method for aligning a sensor. The method includes generating a laser cross-beam in front of a radar sensor included in a vehicle, wherein the laser cross-beam approximately perpendicular to a thrust line of the vehicle. The method also includes mounting a sensor alignment apparatus on the radar sensor. The sensor alignment apparatus includes a mounting arm and a receiver flag. The mounting arm supports the receiver flag, and the receiver flag includes a first surface that intersects the cross-beam at a first point and a second surface opposite the first surface that intersects the cross-beam at a second point. The method further includes determining a position of the first point on the receiver flag, determining a position of the second point on the receiver flag, determining a difference between the position of the first point and the position of the second point, and determining an adjustment for the radar sensor based on the difference.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
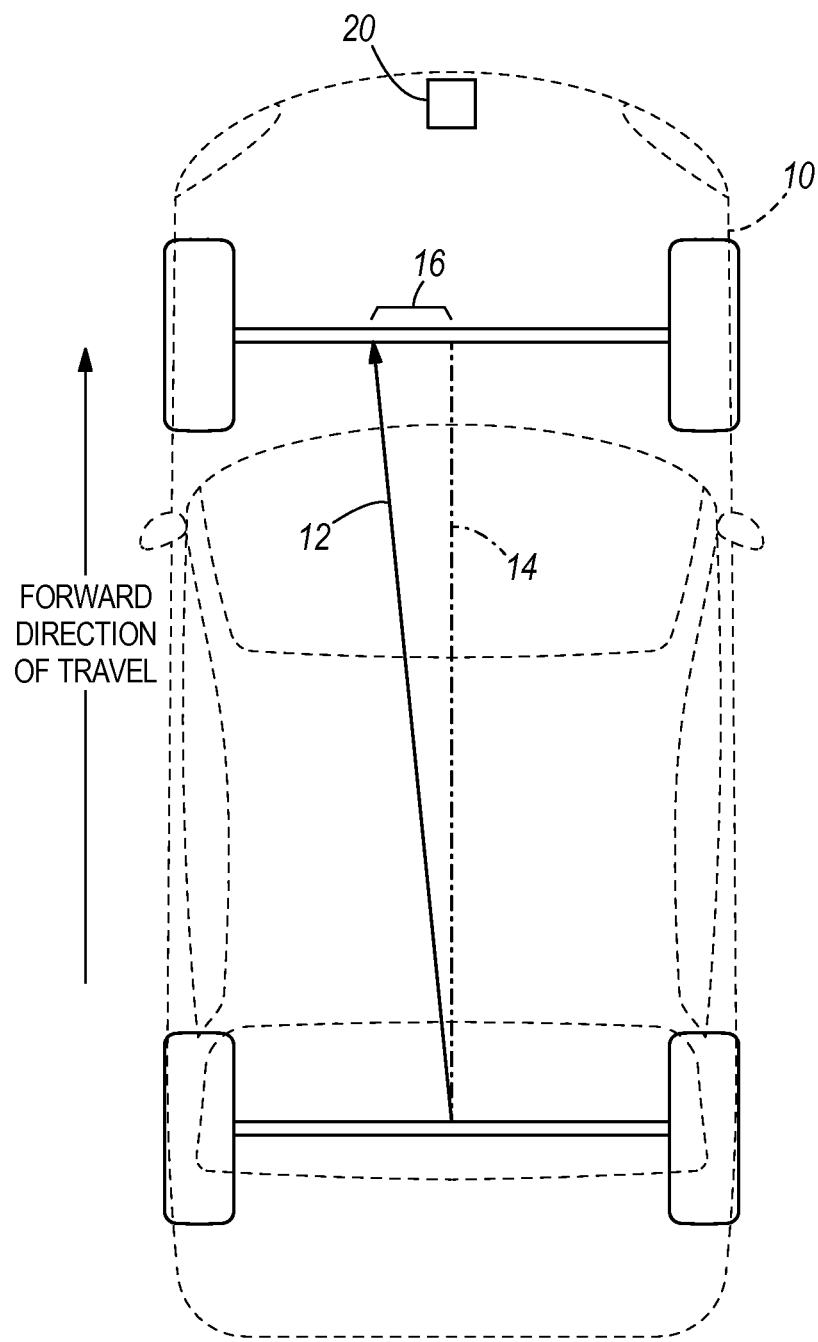
FIG. 1 is a schematic top view of a vehicle.

FIG. 1 illustrates a vehicle 10. The vehicle 10 has a thrust line 12 and a geometric centerline 14. In some embodiments, the thrust line 12 of a vehicle is aligned with the centerline 14. However, in other embodiments, such as the situation illustrated in FIG. 1, the thrust line 12 is misaligned with the centerline 14 by a thrust angle 16. The vehicle 10 also includes at least one radar sensor 20 positioned to detect objects located in front of the vehicle 10. The radar sensor 20 can be part of an ACC system. As noted above, the ACC system adjusts an operator-set cruise speed based on slower-traveling objects detected in front of the vehicle 10 by the radar sensor 20. It should be understood that the radar sensor 20 can also be used with other systems (e.g., parking assist systems) in addition to or in place of the ACC system.

Figure 2:
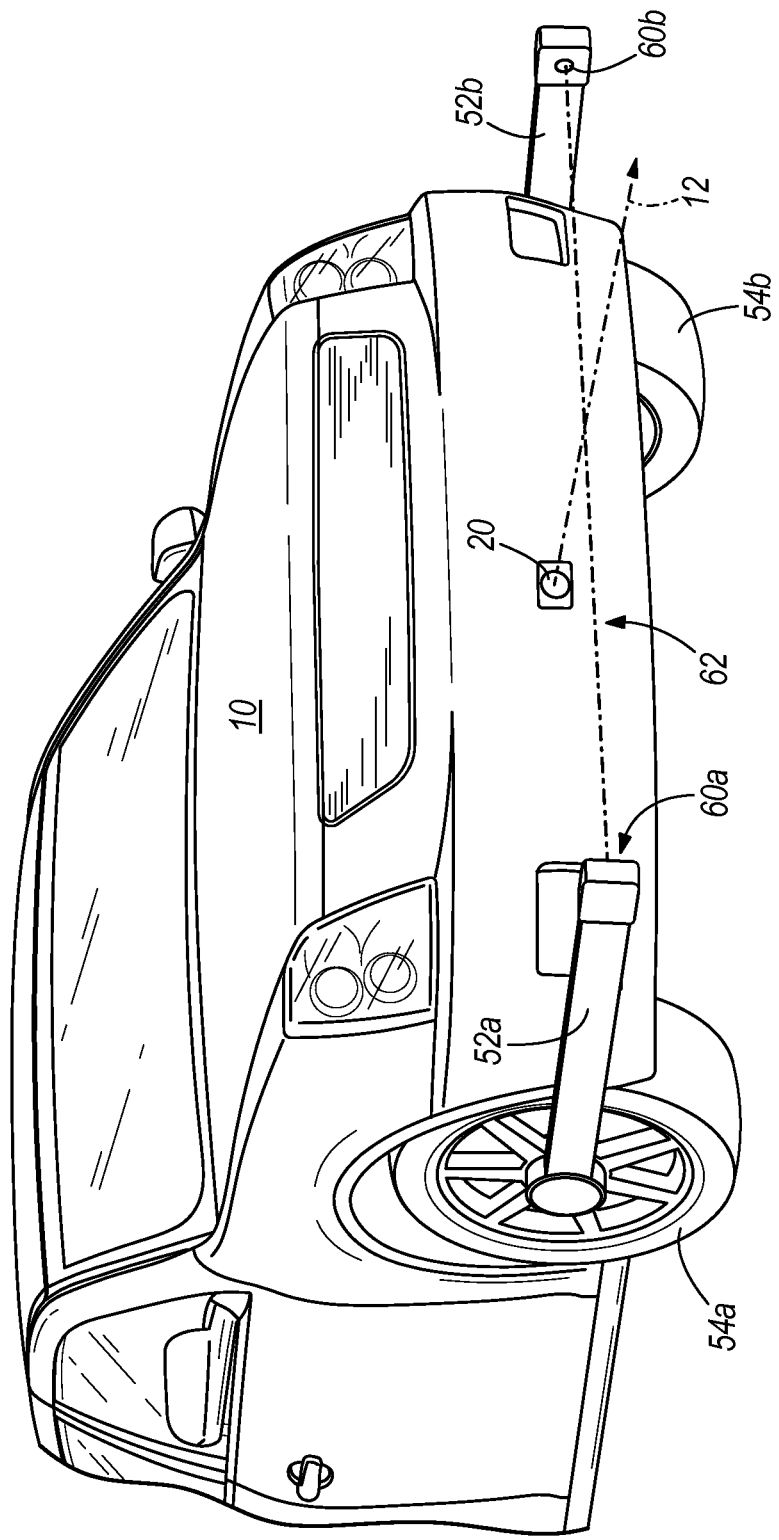
FIG. 2 schematically illustrates wheel alignment equipment for the vehicle of FIG. 1.

To align the radar sensor 20 to the vehicle thrust line 12, wheel alignment equipment is used to create a point of reference for the vehicle's thrust line 12. In particular, as illustrated in FIG. 2, wheel alignment equipment 50 includes a first arm 52a connectable to a first front wheel 54a of the vehicle 10 and a second arm 52b connectable to the opposite front wheel 54b of the vehicle 10. Various clamps and other attachment devices 56 are used to attach the arms 52a and 52b to the wheels 54a and 54b. The arms 52a and 52b are rigid and are coupled to the wheels 54a and 54b such that the arms point in the same direction as the wheels. Accordingly, each arm 52a and 52b is aligned parallel to the vehicle's thrust line 12. In addition, in some embodiments, the arms 52a and 52b are positioned parallel to the surface or ground supporting the vehicle. Also, in some embodiments, each arm 52a and 52b is also connectable to a back wheel. In particular, the first arm 52a can be connected to the first front wheel 54a and a back wheel on the same side of the vehicle 10. Similarly, the second arm 52b can be connected to the second front wheel 54b and a back wheel on the same side of vehicle. Connecting the arms 52a and 52b to both wheels on one side of the vehicle 10 aligns the arms with both wheels on each side of the vehicle 10.

The first arm 52a includes a first laser diode 60a for generating a first visible laser beam 61a (see FIG. 3) toward the second arm 52b. The second arm 52b includes a second laser diode 60b and a power source for generating a second visible laser beam 61b (see FIG. 3) toward the first arm 52a. Therefore, the diodes 60a and 60b create a laser cross-beam 62 in front of the vehicle 10. As illustrated in FIG. 2, the cross-beam 62 is approximately perpendicular to the vehicle's thrust line 12. Therefore, the cross-beam 62 acts as a point of reference for the thrust line 12.

Figure 3:
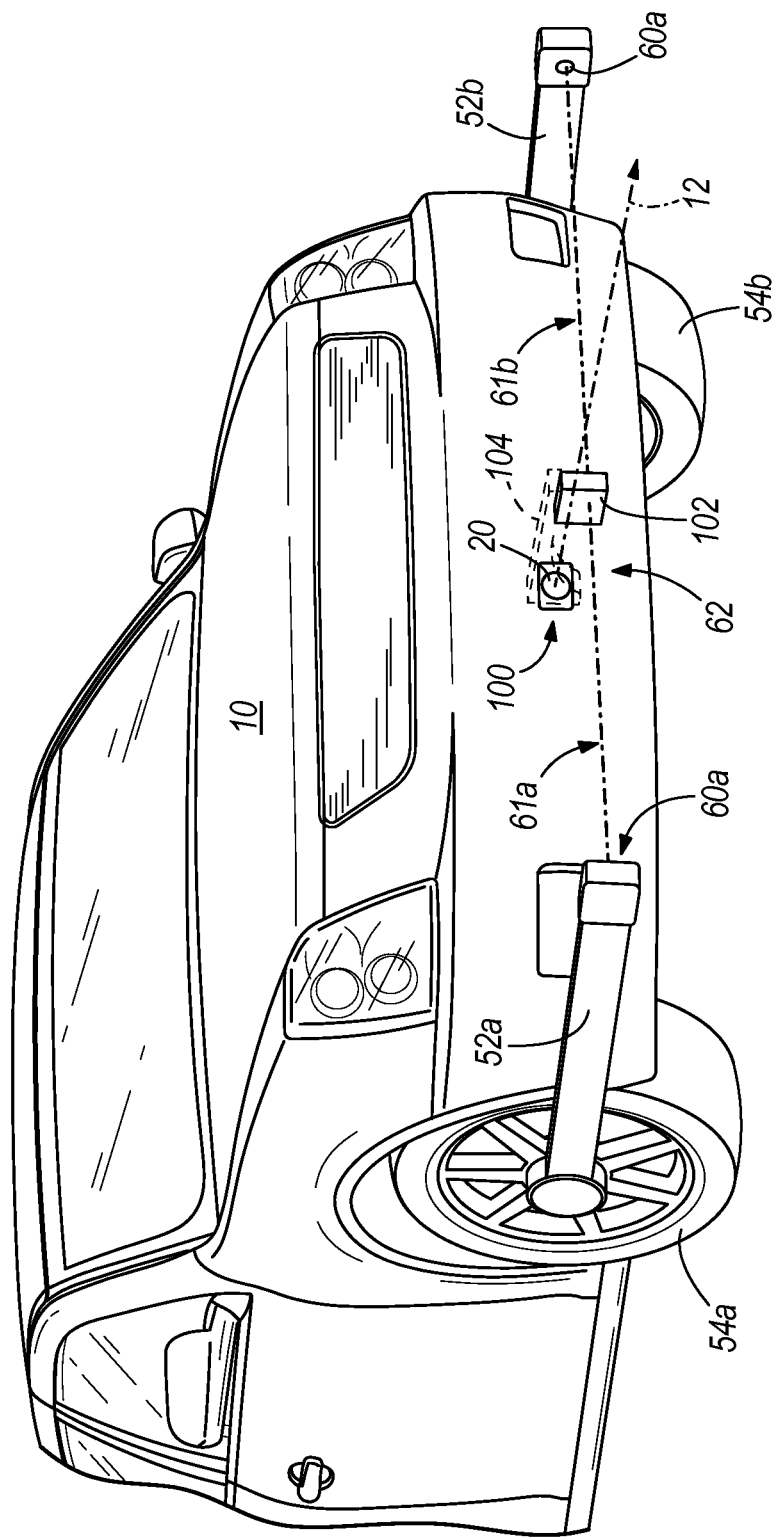
FIG. 3 schematically illustrates a sensor alignment apparatus used with the wheel alignment equipment of FIG. 2.

To align the radar sensor 20, a sensor alignment apparatus 100 is mounted on the radar sensor 20. As illustrated in FIG. 3, the apparatus 100 includes a receiver flag 102 and a mounting arm 104. The mounting arm 104 is coupled to the radar sensor 20 and supports the flag 102, which is positioned approximately perpendicular to the mounting arm 104. The mounting arm 104 can clip to, snap on, hang from, or mate with (e.g., using a suction cup, an adhesive, a friction or static interface, etc.) an external interface of the radar sensor 20. In some embodiments, the mounting arm 104 includes a feature (e.g., indicia, a recess, or a protrusion) that aligns with a mating feature of the radar sensor 20 (e.g., indicia, a recess, or a protrusion) to ensure that the mounting arm 104 is properly mounted. In some embodiments, the mounting arm 104 includes a bubble level 110 that indicates whether the mounting arm 104 is mounted level on the sensor 20.

Figure 5:
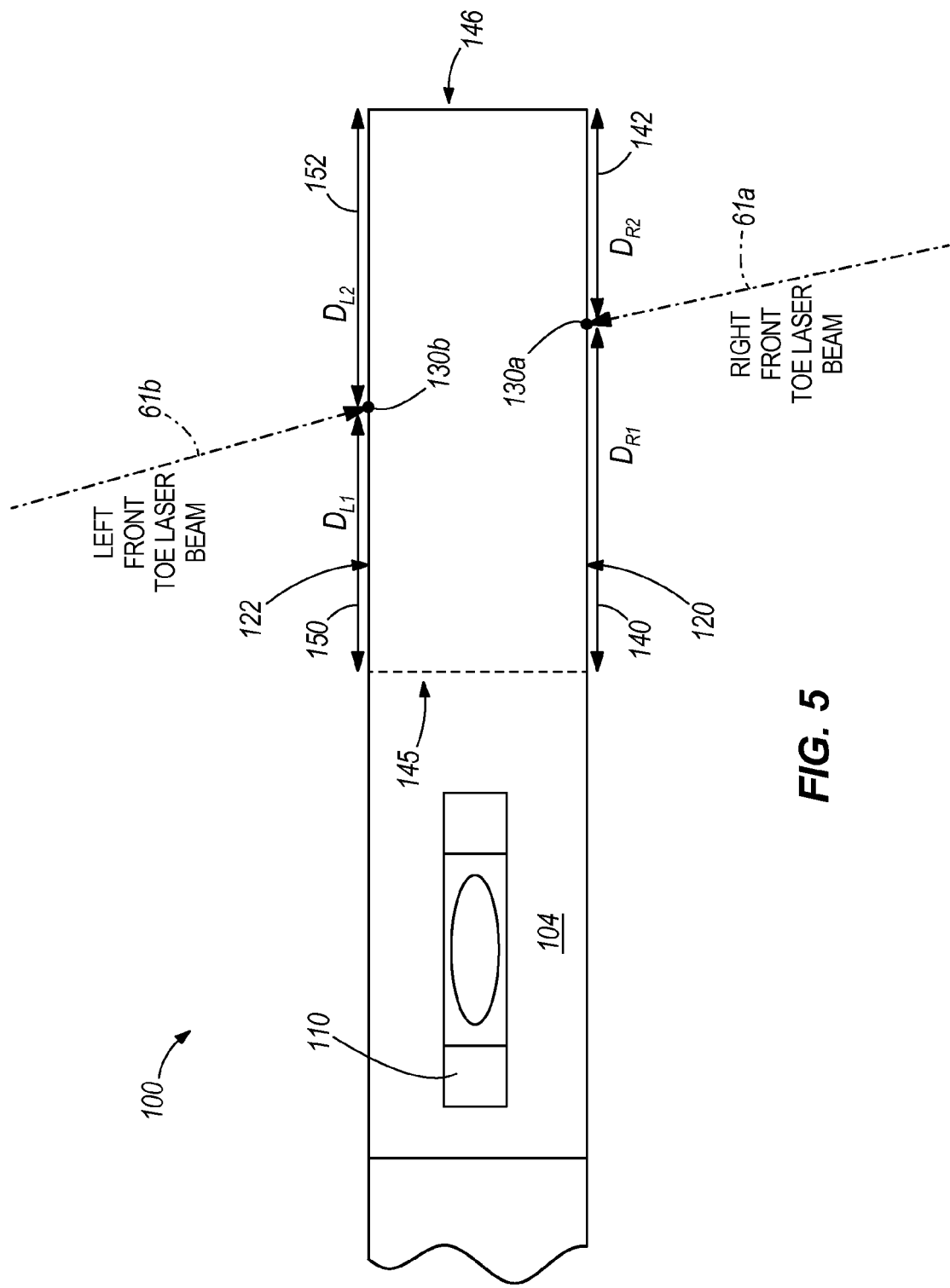
FIG. 5 is a top view of the sensor alignment apparatus of FIG. 3.

When the mounting arm 104 is mounted on the sensor 20, the receiver flag 102 is positioned in front of and aligned with the radar sensor 20. The receiver flag 102 is also positioned such that it intersects the laser cross-beam 62. In particular, the receiver flag 102 includes a first surface 120 and a second surface 122 opposite the first surface 120. When the apparatus 100 is mounted on the vehicle, the first surface 120 faces the diode 60a included in the first arm 52a, and the second surface 122 faces the diode 60b included in the second arm 52b. Therefore, the first surface 120 receives the laser beam 61a generated by the first diode 60a at a first point 130a, and the second surface 122 receives the laser beam 61b generated by the second diode 60b at a second point 130b. FIG. 5 is a top view of the apparatus 100 and illustrates the first point 130a and the second point 130b.

Figure 4:
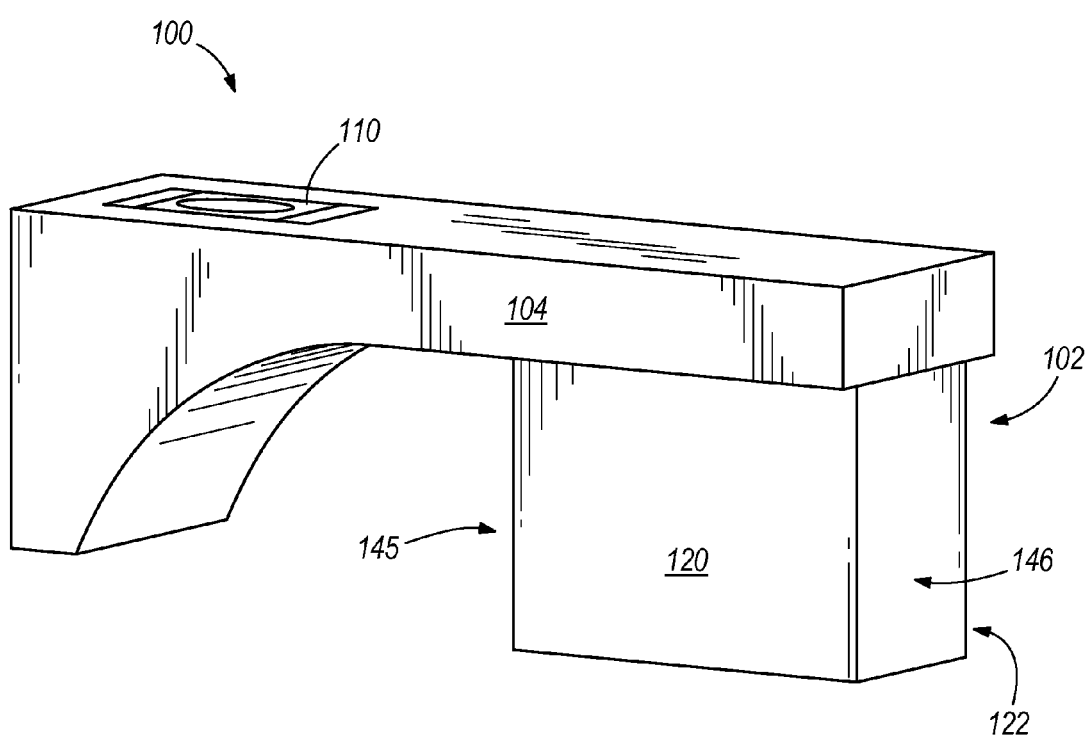
FIG. 4 is a side view of the sensor alignment apparatus of FIG. 3.

To establish axial orientation of the radar sensor 20 with the thrust line 12, two distances for each point 130a and 130b are identified. For example, as illustrated in FIG. 5, the first point 130a has a first distance 140 (labeled $D_{R1}$ in FIG. 5) corresponding to a distance to a front 145 of the flag 102 (closest to the vehicle 10, see FIG. 4) from the first point 130a. In addition, the first point 130a has a second distance 142 (labeled $D_{R2}$ in FIG. 5) that corresponds to a distance to a back 146 of the flag 102 (furthest from the vehicle 10, see FIG. 4) from the first point 130a. Similarly, the second point 130b has a first distance 150 (labeled $D_{L1}$ in FIG. 5) that corresponds to a distance to the front 145 of the flag 102 from the second point 130b and a second distance 152 (labeled $D_{L2}$ in FIG. 5) that corresponds to a distance to the back 146 of the flag 102 from the second point 130b. When the radar sensor 20 is aligned with the vehicle's thrust line 12, the first distance 140 of the first point 130a is approximately equal to the second distance 152 of the second point 130b and the second distance 142 of the first point 130a is approximately equal to the first distance 150 of the second point 130b. Therefore, the difference between these distances can be used (e.g., in conjunction with appropriate offsets for the measured thrust line 12) to determine an adjustment for the radar sensor 20 to align the radar sensor with the thrust line 12 (i.e., physically position the radar sensor 20 approximately perpendicular to the thrust line 12).

Figure 6:
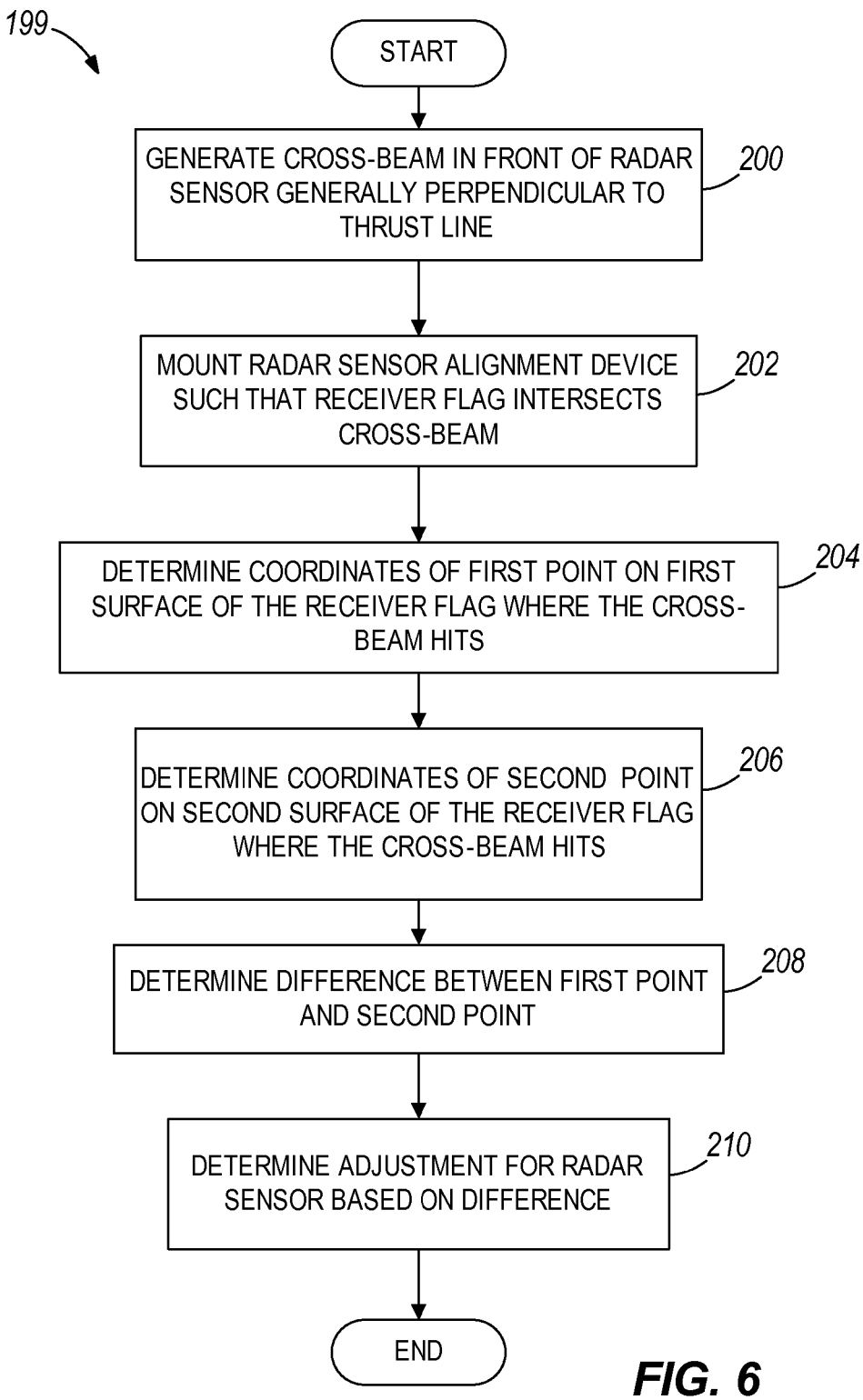
FIG. 6 is a flow chart illustrating a sensor alignment method using the sensor alignment apparatus of FIG. 3.

A service technician can perform a method (e.g., method 199 illustrated in FIG. 6) to align a radar sensor 20 included in a vehicle 10. In particular, the service technician generates a laser cross-beam 62 in front of the sensor 20, which provides a point of reference of the vehicle's thrust line (at 200). As described above, the cross-beam 62 is approximately perpendicular to the vehicle's thrust line 12. The service technician then mounts the sensor alignment apparatus 100 on the radar sensor 20 such that the receiver flag 102 intersects the cross-beam 62 (at 202). As described above, the flag 102 intersects the cross-beam 62 such that the first beam 61a hits the first surface 120 of the flag 102 at a first point 130a and the second beam 61b hits the second surface 122 of the flag 102 at a second point 130a. With the flag 102 intersecting the cross-beam 62, the service technician determines the position (e.g., the distances $D_{R1}$ and $D_{R2}$) of the first point 130a (at 204) and the position (e.g., the distances $D_{L1}$ and $D_{L2}$) of the second point 130a (at 206). The service technician then determines a difference between the positions of the first point 130a and the second point 130b (at 208) and determines an adjustment for the radar sensor 20 based on the difference (at 210).

It should be understood that, in some embodiments, portions of the method 199 can be automated. For example, cameras and other detectors can be used to automatically detect the first point 130a and the second point 130b on the receiver flag 102 and measures the distances (i.e., $D_{R1}$, $D_{R2}$, $D_{L1}$, $D_{L2}$) to the points. The cameras and detectors or other control systems can also be used to calculate the differences between the positions of the first point 130a and the second point 130b and to identify an adjustment for the radar sensor 20 based on the differences. Furthermore, in some embodiments, various control systems can automatically make adjustments to the radar sensor 20 based on the differences between the positions of the first point 130a and the second point 130b (e.g., determined automatically or manually by a service technician).

Various features and advantages of the invention are set forth in the following claims.

What is claimed is:

1. A sensor alignment apparatus comprising:
   a mounting arm configured to be mounted on a radar sensor included in a vehicle, and
   a receiver flag supported by the mounting arm and positioned in front of the radar sensor, the receiver flag including a first surface for receiving a first laser beam at a first point and a second surface opposite the first surface for receiving a second laser beam at a second point, wherein the first laser beam and the second laser beam are approximately perpendicular to a thrust line of the vehicle and a difference between a position of the first point and a position of the second point indicates an adjustment for the radar sensor to align the radar sensor with the thrust line.

2. The apparatus of claim 1, wherein the receiver flag is approximately perpendicular to the mounting arm.

3. The apparatus of claim 1, wherein the mounting arm includes a bubble level.

4. The apparatus of claim 1, wherein the mounting arm is configured to mate with the radar sensor using at least one of a suction cup, an adhesive, and a static interface.

5. The apparatus of claim 1, wherein the mounting arm is configured to clip on to an external surface of the radar sensor.

6. The apparatus of claim 1, wherein the mounting arm is configured to snap on to an external surface of the radar sensor.

7. The apparatus of claim 1, wherein the mounting arm includes a feature that aligns with a feature on the radar sensor for mounting the mounting arm.

8. A system for aligning a sensor, the system comprising:
wheel alignment equipment including
a first arm connectable to a first wheel of a vehicle and including a first laser for generating a first visible laser beam approximately perpendicular to a thrust line of the vehicle.
a second arm connectable to a second wheel of the vehicle and including a second laser for generating a second visible laser beam approximately perpendicular to the thrust line of the vehicle; and
a sensor alignment apparatus including
a mounting arm configured to be mounted on a radar sensor included in the vehicle, and
a receiver flag supported by the mounting arm and positioned in front of the radar sensor, the receiver flag including a first surface for receiving the first laser beam at a first point and a second surface opposite the first surface for receiving the second laser beam at a second point, wherein a difference between a position of the first point and a position of the second point indicates an adjustment for the radar sensor to align the radar sensor with the thrust line.

9. The system of claim 8 wherein the mounting arm includes a bubble level.

10. The system of claim 8 wherein the receiver flag is positioned approximately perpendicular to the mounting arm.

11. The system of claim 8 wherein the position of the first point includes a first distance to a front of the receiver flag from the first point and a second distance to a back of the receiver flag from the first point.

12. The system of claim 11 wherein the position of the second point includes a first distance to the back of the receiver flag from the second point and a second distance to a front of the receiver flag from the second point.

13. The system of claim 12 wherein a difference between the first distance of the first point and the second distance of the second point and a difference between the second distance of the first point and the first distance of the second point indicates an adjustment for the radar sensor to align the radar sensor with the thrust line.

14. A method for aligning a radar sensor comprising:
generating a laser cross-beam in front of a radar sensor included in a vehicle, the laser cross-beam approximately perpendicular to a thrust line of the vehicle;
mounting a sensor alignment apparatus on the radar sensor, the apparatus including a mounting arm and a receiver flag, the mounting arm supporting the receiver flag and the receiver flag including a first surface intersecting the cross-beam at a first point and a second surface opposite the first surface intersecting the cross-beam at a second point;
determining a position of the first point on the receiver flag;
determining a position of the second point on the receiver flag;
determining a difference between the position of the first point and the position of the second point; and
determining an adjustment for the radar sensor based on the difference.

15. The method of claim 14, wherein generating the laser cross-beam includes generating the laser cross-beam using wheel alignment equipment, the wheel alignment equipment including a first arm coupled to a first wheel and including a first laser generating a first laser beam and a second arm coupled to a second wheel and including a second laser generating a second laser beam, wherein the first laser beam and the second laser beam generate the laser cross-beam.

16. The method of claim 14, wherein determining the position of the first point includes determining a first a distance to a front of the receiver flag from the first point and a second distance to a back of the receiver flag from the first point.

17. The method of claim 16, wherein determining the position of the second point includes determining a first distance to the back of the receiver flag from the second point and a second distance to the front of the receiver flag from the second point.

18. The method of claim 17, wherein determining a difference between the position of the first point and the position of the second point includes determining a difference between the first distance of the first point and the second distance of the second point and a difference between the second distance of the first point and the first distance of the second point.

\* \* \* \* \*